United States Patent
Chockler et al.

(10) Patent No.: US 7,921,411 B2
(45) Date of Patent: Apr. 5, 2011

(54) MODEL CHECKING OF NON-TERMINATING SOFTWARE PROGRAMS

(75) Inventors: Hana Chockler, Haifa (IL); Ziv Glazberg, Haifa (IL); Benyamin Godlin, Jerusalem (IL); Sharon Keidar-Barner, Yokneam Ilit (IL)

(73) Assignee: International Business Machines Corporation, Armonk, NY (US)

( * ) Notice: Subject to any disclaimer, the term of this patent is extended or adjusted under 35 U.S.C. 154(b) by 1202 days.

(21) Appl. No.: 11/551,264

(22) Filed: Oct. 20, 2006

(65) Prior Publication Data

US 2008/0098347 A1 Apr. 24, 2008

(51) Int. Cl.
*G06F 9/44* (2006.01)
(52) U.S. Cl. ......... 717/126; 717/104; 717/105; 717/127
(58) Field of Classification Search .................. None
See application file for complete search history.

(56) References Cited

U.S. PATENT DOCUMENTS

| | | | |
|---|---|---|---|
| 6,944,838 B2* | 9/2005 | McMillan | 716/5 |
| 7,058,925 B2* | 6/2006 | Ball et al. | 717/106 |
| 7,584,455 B2* | 9/2009 | Ball | 717/124 |
| 7,653,520 B2* | 1/2010 | De Moura et al. | 703/2 |
| 2004/0019468 A1 | 1/2004 | De Moura et al. | |
| 2005/0071147 A1 | 3/2005 | Clarke et al. | |
| 2005/0166167 A1* | 7/2005 | Ivancic et al. | 716/5 |
| 2005/0229044 A1 | 10/2005 | Ball | |
| 2005/0262456 A1* | 11/2005 | Prasad | 716/4 |
| 2005/0283743 A1* | 12/2005 | Mulholland et al. | 716/1 |
| 2006/0031730 A1* | 2/2006 | Hsiao et al. | 714/738 |
| 2006/0282807 A1* | 12/2006 | Ivancic et al. | 716/5 |
| 2007/0011629 A1* | 1/2007 | Shacham et al. | 716/3 |
| 2007/0157180 A1* | 7/2007 | Tillmann et al. | 717/140 |
| 2007/0168988 A1* | 7/2007 | Eisner et al. | 717/126 |
| 2007/0226665 A1* | 9/2007 | Ganai et al. | 716/5 |

OTHER PUBLICATIONS

K.L. Interpolation and SAT-Based Model Checking, 2003, pp. 1-13.*
Applications of Craig Interpolants in Model Checking http://www.cadence.com/company/cadence_labs/mcmillan_TACAS_2005_Applications.pdf.
Bounded model checking of infinite state systems (*Source:* http://rsg.informatik.uni-kl.de/publications/data/ScSc06.pdf).
Bounded model checking of concurrent programs (*Source:* http://www.inf.ethz.ch/personal/daniekro/classes/se-sem/ss2005/papers/192.pdf).
Bounded model checking of infinite state systems: exploiting the automata hierarchy http://rsg.informatik.uni-kl.de/publications/data/ScSc04b.pdf#search=%22%22Bounded%20model%20checking%20of%20infinite%20state%20systems%3A%20exploiting%20the%20automata%20hierarchy%22%22).
Interpolant-based Transition Relation Approximation http://www.cse.ucsd.edu/~rjhala/papers/interpolant_based_transition_relation_approximation.pdf#search=%22%22Blast%20software%20model%20checker%22%22.
R. Cytron, J. Ferrante, B. K. Rosen, M. N. Wegman, F. K. Zadeck: An Efficient Method of Computing Static Single Assignment Form. *POPL 1989*: 25-35.
W. Craig: Linear Reasoning. A New Form o fthe Herbrand-Gentzen Theorem. *The Journal of Symbolic Logic*, 1957: 250-268.

* cited by examiner

*Primary Examiner* — Tuan Q Dam
*Assistant Examiner* — Isaac T Tecklu

(57) ABSTRACT

A method for verifying software program code includes specifying a property that the software program code is expected to satisfy. The software program code and the property are transformed into an initial logical formula in a static single assignment (SSA) form, the formula including variables. A loop in the software program code is identified. Successive over-approximations are applied to a portion of the initial logical formula corresponding to the loop in order to produce a modified logical formula in the SSA form that represents a finite over-approximation of a set of states that are reachable by the loop. It is verified that the software program code satisfies the specified property by determining whether there is an assignment of the variables that satisfies the modified logical formula.

15 Claims, 2 Drawing Sheets

MODEL CHECKING OF NON-TERMINATING SOFTWARE PROGRAMS

FIELD OF THE INVENTION

The present invention relates generally to formal methods of verification, and specifically to model checking of software programs.

BACKGROUND OF THE INVENTION

Model checking techniques are widely used in design verification of complex hardware systems and, to a lesser extent, in verification of software programs. In model checking, a test engineer specifies properties that the system under design is expected to fulfill. The model checker then verifies that there is no reachable state of the system that will violate the property, or else it finds a counterexample, i.e., an input sequence and succession of state transitions in the model that lead to violation of one of the properties.

A variety of techniques are known in the art for carrying out this sort of model checking. One well-known technique is bounded model checking (BMC), in which the system under design and the property to be verified are represented as Boolean formulas. The model checker attempts to find a counterexample by applying a propositional satisfiability (SAT) technique to the conjunction of the Boolean formulas. BMC considers only counterexamples up to a particular depth K (i.e., extending over K steps of the transition relation of the system), and generates a propositional formula that is satisfiable if and only if a counterexample exists. Various methods of automatic SAT solving that may be used in this context are known in the art. Some representative methods are described, for example, in U.S. Pat. No. 7,047,139, whose disclosure is incorporated herein by reference.

Although BMC has been used mainly in verification of hardware designs, a number of BMC-based software verification techniques have been developed. Techniques of this sort are described, for example, in U.S. Patent Application publications US 2004/0019468 A1 and US 2005/0166167 A1, whose disclosures are incorporated herein by reference.

In some applications of BMC, the Boolean formula representing the system under design may be transformed into a static single assignment (SSA) form. For example, U.S. Patent Application Publication US 2005/0071147 A1, whose disclosure is incorporated herein by reference, describes a method for verifying a circuit design using a SAT solver that operates on a SSA representation of a C-language program. The SSA form, which is well known in the art, and a method for its computation are described by Cytron et al., in "An Efficient Method of Computing Static Single Assignment Form," *Proceedings of the 16th ACM SIGPLAN-SIGACT Symposium on Principles of Programming Languages* (ACM Press, 1989), pages 25-35, which is incorporated herein by reference.

Even if the SAT solver used in BMC is unable to find a counterexample in K steps, there may still be a state of the system that is reachable in a greater number of steps and violates the specified property. A number of methods have been proposed to enable the SAT solver to cover all reachable states of the system by successive over-approximations of the state space, and thus to verify that the property is satisfied on all states. For example, U.S. Pat. No. 6,944,838, whose disclosure is incorporated herein by reference, describes a design verifier that includes a bounded model checker, a proof partitioner and a fixed-point detector. If the bounded model checker does not find a counterexample at some depth K, the proof partitioner provides an over-approximation of the states that are reachable in one or more steps using a proof generated by the bounded model checker. (This sort of over-approximation is commonly known as a Craig interpolant.) The fixed-point detector detects whether the over-approximation is at a fixed point. If so, the design is verified.

SUMMARY OF THE INVENTION

A disclosed embodiment of the present invention provides a method for verifying software program code, with respect to a specified property that the software program code is expected to satisfy. The software program code and the property are transformed into an initial logical formula in a static single assignment (SSA) form, wherein the formula includes variables. A loop is identified in the software program code. Successive over-approximations are applied to a portion of the initial logical formula corresponding to the loop in order to produce a modified logical formula in the SSA form that represents a finite over-approximation of a set of states that are reachable by the loop. The method verifies that the software program code satisfies the specified property by determining whether there is an assignment of the variables that satisfies the modified logical formula.

The present invention will be more fully understood from the following detailed description of the embodiments thereof, taken together with the drawings in which:

DETAILED DESCRIPTION OF EMBODIMENTS

Figure 1:
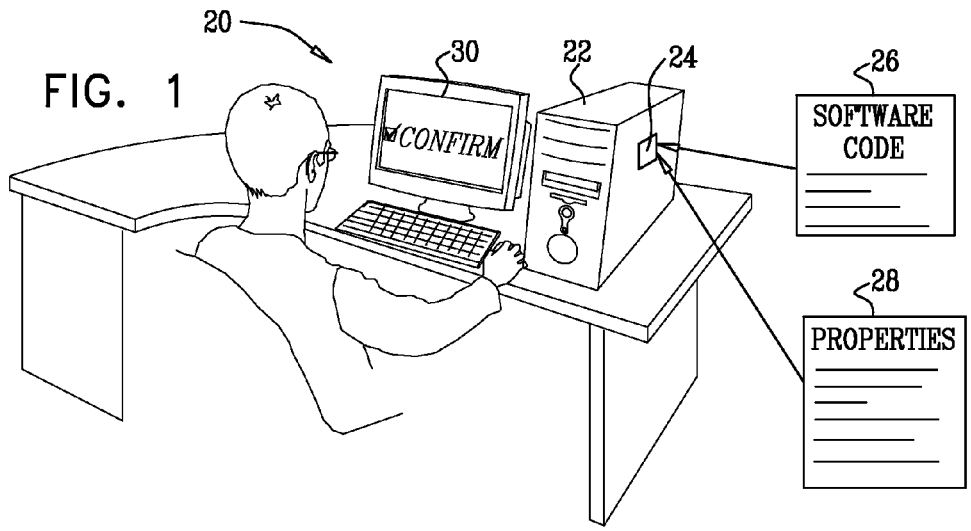
FIG. 1 is a schematic, pictorial illustration of a system for software code verification, in accordance with an embodiment of the present invention.

Embodiments of the present invention that are described hereinbelow combine SSA-based BMC techniques with state space over-approximation using Craig interpolants in order to verify software program code containing infinite loops. For this purpose, the program code is converted into SSA formulas, in a manner similar to that described in the above-mentioned US 2005/0071147 A1. Successive application of a Craig interpolant is then used to over-approximate the set of states reachable by iteration of an infinite loop, and thus to verify assertions of properties that should hold true in the program. To facilitate application of the Craig interpolant, a program with multiple loops may first be transformed into an equivalent program with one (possibly infinite) loop before computing the interpolant.

In the inventors' experience in verifying software, they have found that many, if not most, programs are non-terminating and are used in systems that react to their environment. Even small abstract programs, such as communication protocols, may contain infinite loops (because the parties are constantly ready to send and receive messages). The methods described hereinbelow are therefore particularly advantageous in that they automatically synthesize a software model to which a Craig interpolant may be applied, and thus generate a finite model of a non-terminating program. BMC may then be applied to this finite model in order not only to find counterexamples when a given property is violated, but also to verify conclusively that the software under test satisfies the property when no counterexamples are found.

In SAT-based BMC, the model for verification is described by a conjunction of three formulas:
1. Initial states I;
2. Transition relation TR;
3. The verified property P.

The model is then unwound to a length of K cycles, and a SAT solver is used to find a satisfying assignment of the model variables that falsifies the property, i.e., the SAT solver tries to find a satisfying assignment for the Boolean formula $I \wedge TR \wedge K \wedge !P$. A satisfying assignment in this case represents a path through the state space of the model that does not satisfy P, i.e., a counterexample. When no satisfying assignment is found, the SAT solver increases K and repeats the procedure. In the case of an infinite loop, however, K may be unbounded, so that BMC alone will be unable to confirm that there are no counterexamples in the entire state space.

In order to overcome this difficulty, embodiments of the present invention use successive over-approximation based on a Craig interpolant, which operates generally as follows: Let A and B be formulas such that $A \wedge B$ is unsatisfiable. Then, there exists an interpolant C such that C contains only the common variables of A and B, such that A implies C, and $C \wedge B$ is unsatisfiable. In other words, C represents the part of A that is necessary to create a contradiction with B. The methods described herein apply a Craig interpolant to the formula $I \wedge TR \wedge TR^{\wedge}(K-1) \wedge !P$, for some K>0, wherein $A = I \wedge TR$ and $B = TR^{\wedge}(K-1) \wedge !P$. If the formula $I \wedge TR \wedge TR^{\wedge}(K-1) \wedge !P$ is unsatisfiable, the interpolant exists. The interpolant thus produced is an over-approximation of the first symbolic step, that is, it represents all states that are at a distance of one step of TR from I.

Upon finding an interpolant C, the procedure is repeated with A=C until a fixed point is reached, or a satisfying assignment is found. A satisfying assignment can represent either a real bug in the model or can result from over-approximation. In the latter case, K is increased and the procedure is repeated. The use of a similar interpolant-based method for hardware verification is described in the above-mentioned U.S. Pat. No. 6,944,838, and may be adapted, mutatis mutandis, for use in the present software verification techniques as described hereinbelow.

FIG. 1 is a schematic, pictorial illustration of a system 20 for software code verification, in accordance with an embodiment of the present invention. System 20 comprises a verification processor 22, which typically comprises a general-purpose computer, which is programmed in software to carry out the functions described herein. This software may be downloaded to processor 22 in electronic form, over a network, for example, or it may alternatively be provided on tangible media, such as optical, magnetic or electronic memory media. Although processor 22 is shown in the figure in the form of a single computer, the functions of the processor may alternatively be distributed among a group of computers. Further alternatively or additionally, at least some of the functions of the processor may be performed by one or more dedicated hardware devices.

Processor 22 receives software code 26 for verification via an input 24, such as a communication port or memory interface. The processor also receives a set of one or more properties 28 that the software code is expected to satisfy. Processor 22 converts the software code to SSA form, and then applies over-approximation and SAT solving techniques, as described hereinbelow, in order to verify that code 26 satisfies properties 28. The results of this verification process are presented to a user by an output device 30, such as a display monitor or printer.

Figure 2:
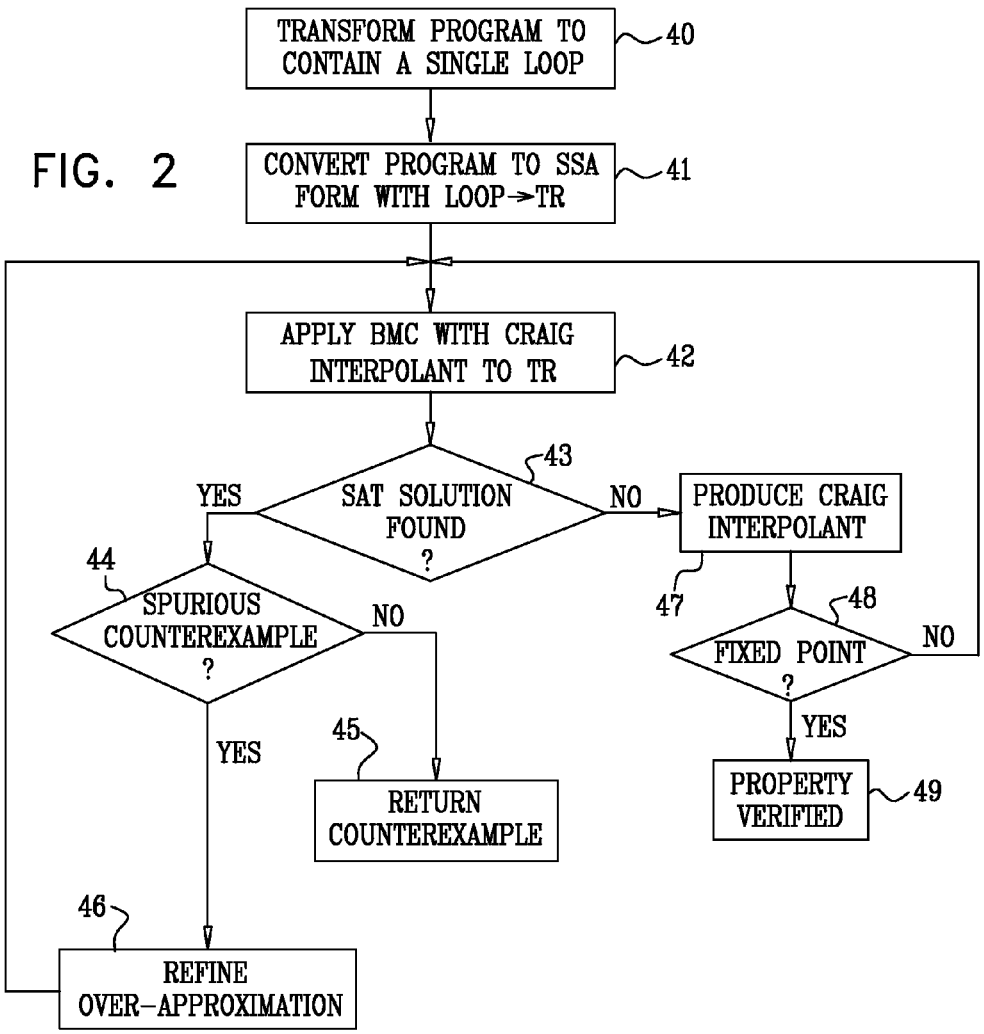
FIG. 2 is a flow chart that schematically illustrates a method for software code verification, in accordance with an embodiment of the present invention.

FIG. 2 is a flow chart that schematically illustrates a method for software code verification, in accordance with an embodiment of the present invention. In general, a software program may have multiple infinite loops. To facilitate the operation of Craig interpolants in verifying the program under test, processor 22 may modify the form of the program, without changing its functionality, so that the program contains only a single infinite loop, at a program transformation step 40. Details of this step are described hereinbelow with reference to FIG. 3.

Processor then converts the program under test to SSA form, at a program conversion step 41. This sort of conversion is illustrated below with reference to the simple program shown in the following listing:

LISTING I

```
/* before loop*/
x=10;
y=11;
/* loop */
while (x==10) {
    x=input ( ); //input denotes a nondeterministic input
    y=x+1;
}
/* end loop */
assert(y==x+1);
```

This code contains an endless loop: input( ) may return 10 at every iteration, and thus will force an additional iteration of the loop. The assert( ) statement at the end of the listing represents the property to be verified.

For the purpose of subsequent application of a Craig interpolant, the SSA formula produced at step 42 has three parts:
I—everything before the loop at the beginning of the code;
TR—the code for one loop iteration;
P—the specified property (in this case, the property that the assertion does not fail).

Referring to Listing I, the "before loop" part of the code is transformed into the following SSA formula (the "I" part of the three-part formula):

$$x1=10 \&\& y1=11$$

The "loop" (the TR part) is transformed into:

$$x1 = nondet1 \&\& y1 = x1+1$$

wherein "nondet" can be any number. The "end loop" (the P part, in negated form) is transformed into:

$$!(y1=x1+1)$$

The transformation may be carried out automatically using the method described in the above-mentioned US 2005/0071147 A1.

Processor 22 now applies BMC to the formula made up of I, $TR^{\wedge}K$ and P, for successively-increasing numbers of iterations K, using a Craig interpolant to perform successive over-approximations of the state space reached by TR, at an interpolation step 42. This step follows the lines of the proof-partitioning technique described in the above-mentioned U.S. Pat. No. 6,944,838, except that here the interpolant is applied to the SSA representation of the software code. At the first iteration through step 42, the Craig interpolant is simply the "I" part of the formula.

At each iteration through step 42, processor 22 creates new variables, in accordance with SSA convention, and adds suitable "guard" statements corresponding to the control statements in the program. For example, taking K=2 with the formula derived above based on Listing I, the SSA formula becomes:

$$x1=10 \&\& y1=11 \&\& x2=[(x1=10)?nondet1,x1] \&\&$$

$$y2=[(x1=10)?x2+1,y1] \&\& y3=[(x2=10)?x3+1,y2] \&\&$$

$$x3=[(x2=10)?nondet2,x2] \&\& (y3=x3+1)$$

In this formula, the "?" operator is used in guard statements with the following meaning: a?b,c evaluates to b if a is true, and otherwise to c. The loop (TR) in this example is unwound twice (since K=2). At each iteration, the loop is executed only if the guard expression corresponding to the "while" statement is true. Therefore, assignments within the loop will take place only as long as the guard expression is true. Otherwise, the variable in question retains its previous value. The assert statement at the end of the formula operates on the last values of x and y, i.e., x3 and y3 in the case of K=2.

In the above example, if there had been an additional assert within the "while" loop, then the P part of the formula would have checked every value of x and y, and not just the last values. If there had been additional code in Listing I after the loop, it would also have been translated into a formula, which would have operated on the values of x3 and y3 as its input values.

Processor 22 applies the Craig interpolant and BMC SAT solver to the formula representing the software code under test at each successive value of K. It determines whether it has found a satisfying assignment to the current SSA formula, at a solution checking step 43. If so, it means that property P has been violated (i.e., the formula corresponding to !P is satisfied). The processor in this case determines whether this result belongs to the actual state space reachable by application of the TR, or whether it is a spurious counterexample, due only to the over-approximation, at a counterexample checking step 44. If the result belongs to the actual state space, the processor returns the satisfying assignment to the user via output 30 as a counterexample, at a reporting step 45. If the counterexample is spurious, processor 22 refines the over-approximation, at a refinement step 46. An example of such refinement is increasing K and restarting the process.

If no counterexample is found at step 43, processor 22 computes a new Craig interpolant, at an interpolant production step 47. Referring to the example given above, the first interpolant will be:

$$x2=nondet1 \&\& y2=x2+1.$$

(When this interpolant is substituted for I in the SSA formula above, it will become [x1=nondet1 && y1=x1+1].) The processor then determines whether the successive Craig interpolants have reached a fixed point, at a fixed point evaluation step 48. If so, the processor concludes that there is no counterexample to be found in the entire state space corresponding to the software code under test. It therefore informs the user that the property P is satisfied over all states, and that it has thus verified that the software satisfies the property, at a verification step 49.

Otherwise, if a fixed point has not yet been reached at step 48, processor 22 increments K and returns to step 42. Referring again to our example, the first interpolant listed above does not yield a fixed point. The processor will reach a fixed point in the next two interpolations, which will produce the same interpolant:

$$[x1=10 \&\& y1=x1+1] \text{ or } [x1!=10 \&\& y1=x1+1].$$

Although the procedure above refers to a program that contains no more than a single loop, or has been transformed at step 40 to have only a single loop, processor 22 may alternatively compute the interpolant separately for each loop step-by-step, without unifying the loops. The disadvantage of this approach is that the checking process may not terminate if one of the loops does not converge, although in actual operation of the program, the non-converging loop may be canceled by another loop.

Alternatively, processor 22 may over-approximate the "I" part of the formula at every step, rather than the TR part. For this purpose, the processor starts by analyzing the last loop with respect to the specified property, and over-approximates the I that will assure that P holds. This procedure continues backwards to the previous loop and over-approximates the I that assures that the next desired I will assure that P holds. This backward over-approximation continues until the first loop is reached, in which I is already given.

Figure 3:
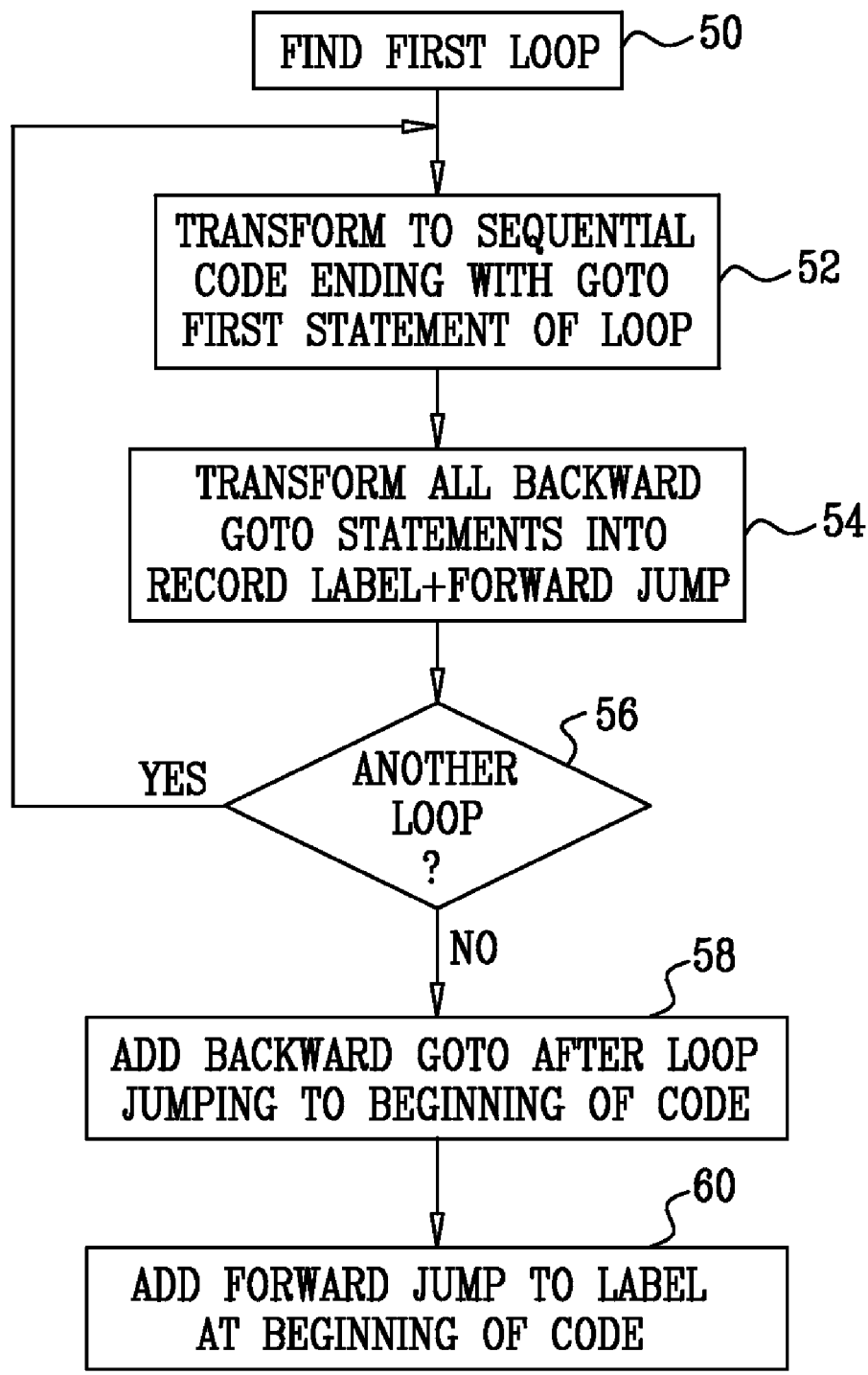
FIG. 3 is a flow chart that schematically illustrates a method for transforming a software program into a form having a single loop, in accordance with an embodiment of the present invention.

FIG. 3 is a flow chart that schematically shows details of program transformation step 40, in which all the loops in the program under test are combined into a single loop, in accordance with an embodiment of the present invention. Processor 22 finds the first loop in the program, at an initial loop finding step 50. It then transforms the loop into sequential code that ends with a goto statement, which jumps to the first statement of the loop, at a loop transformation step 52. If the loop repetition is conditional, then the jump is "guarded" by a statement of the condition, as explained above.

Every goto statement that jumps backward (thus, creating a loop) is transformed into two statements, at a goto transformation step 54. The first of these statements records the label to which the goto was supposed to jump, while the second statement jumps forward to a selected location in the code, common to all the loops. Steps 52 and 54 are repeated, at a loop repetition step 56, until all the code in all the loops is strung together in a single sequence.

Processor 22 then adds one backward goto statement in the common code in the end of the program (after all the loops in the program), at a goto addition step 58. This goto statement jumps to the beginning of the code, thus performing the one and only backward goto in the transformed program and closing the only loop. This goto statement is guarded by the condition that a label has been recorded at one of the statements added in step 54.

Finally, the processor adds code at the beginning of the program, before the loop, that jumps forward to the recorded label, at a jump addition step 60. The jump is guarded by the condition that such a label exists. The added code also erases the label from the record. At this point, the code contains only a single loop.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for verifying software program code, comprising:
   specifying a property that the software program code is expected to satisfy;
   transforming the software program code and the property into an initial logical formula in a static single assignment (SSA) form, the formula comprising variables;

identifying a loop in the software program code;

applying successive over-approximations to a portion of the initial logical formula corresponding to the loop in order to produce a modified logical formula in the SSA form that represents a finite over-approximation of a set of states that are reachable by the loop; and verifying that the software program code satisfies the specified property by determining whether there is an assignment of the variables that satisfies the modified logical formula.

2. The method according to claim 1, wherein identifying the loop comprises identifying multiple loops in the software program code, and modifying the software program code so as to combine the multiple loops into a single loop to which the successive over-approximations are applied.

3. The method according to claim 1, wherein applying the successive over-approximations comprises defining a transition relation corresponding to the identified loop, and applying a Craig interpolant to the transition relation.

4. The method according to claim 1, wherein determining whether there is an assignment comprises applying a bounded model checker (BMC) to solve a propositional satisfiability (SAT) problem over the modified logical formula and the variables.

5. The method according to claim 4, wherein the modified logical formula comprises a negation of the specified property, and wherein applying the BMC comprises generating a counterexample if the BMC finds the assignment of the variables that satisfies the modified logical formula, and otherwise verifying that the software program code satisfies the specified property.

6. Apparatus for verifying software program code, comprising:

an input, which is coupled to receive a specification of a property that the software program code is expected to satisfy; and a verification processor, which is arranged to transform the software program code and the property into an initial logical formula in a static single assignment (SSA) form, the formula comprising variables, to identify a loop in the software program code, to apply successive over-approximations to a portion of the initial logical formula corresponding to the loop in order to produce a modified logical formula in the SSA form that represents a finite over-approximation of a set of states that are reachable by the loop, and to verify that the software program code satisfies the property by determining whether there is an assignment of the variables that satisfies the modified logical formula.

7. The apparatus according to claim 6, wherein the verification processor is arranged to identify multiple loops in the software program code, and to modify the software program code so as to combine the multiple loops into a single loop to which the successive over-approximations are applied.

8. The apparatus according to claim 6, wherein the verification processor is arranged to apply the successive over-approximations by defining a transition relation corresponding to the identified loop, and applying a Craig interpolant to the transition relation.

9. The apparatus according to claim 6, wherein the verification processor is arranged to determine whether there is an assignment by applying a bounded model checker (BMC) to solve a propositional satisfiability (SAT) problem over the modified logical formula and the variables.

10. The apparatus according to claim 9, wherein the modified logical formula comprises a negation of the specified property, and wherein the verification processor is arranged to generate a counterexample if the BMC finds the assignment of the variables that satisfies the modified logical formula, and otherwise to verify that the software program code satisfies the specified property.

11. A computer software product for verifying software program code, the product comprising:

a non-transitory computer-readable medium;

program instructions, when read by a computer, cause the computer to:

receive a specification of a property that the software program code is expected to satisfy, to transform the software program code and the property into an initial logical formula in a static single assignment (SSA) form, the formula comprising variables, to identify a loop in the software program code, to apply successive over-approximations to a portion of the initial logical formula corresponding to the loop in order to produce a modified logical formula in the SSA form that represents a finite over-approximation of a set of states that are reachable by the loop, and to verify that the software program code satisfies the property by determining whether there is an assignment of the variables that satisfies the modified logical formula; and wherein said program instructions are stored on said non-transitory computer-readable medium.

12. The product according to claim 11, wherein the instructions cause the computer to identify multiple loops in the software program code, and to modify the software program code so as to combine the multiple loops into a single loop to which the successive over-approximations are applied.

13. The product according to claim 11, wherein the instructions cause the computer to apply the successive over-approximations by defining a transition relation corresponding to the identified loop, and applying a Craig interpolant to the transition relation.

14. The product according to claim 11, wherein the instructions cause the computer to determine whether there is an assignment by applying a bounded model checker (BMC) to solve a propositional satisfiability (SAT) problem over the modified logical formula and the variables.

15. The product according to claim 14, wherein the modified logical formula comprises a negation of the specified property, and wherein the instructions cause the computer to generate a counterexample if the BMC finds the assignment of the variables that satisfies the modified logical formula, and otherwise to verify that the software program code satisfies the specified property.

\* \* \* \* \*